United States Patent
Ma et al.

(10) Patent No.: US 11,768,874 B2
(45) Date of Patent: Sep. 26, 2023

(54) COMPACT ENTITY IDENTIFIER EMBEDDINGS

(71) Applicant: Microsoft Technology Licensing, LLC, Redmond, WA (US)

(72) Inventors: Yiming Ma, Menlo Park, CA (US); Xuhong Zhang, Sunnyvale, CA (US); Wei Lu, Santa Clara, CA (US); Mingzhou Zhou, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1125 days.

(21) Appl. No.: 16/225,888

(22) Filed: Dec. 19, 2018

(65) Prior Publication Data
US 2020/0201908 A1 Jun. 25, 2020

(51) Int. Cl.
*G06F 16/901* (2019.01)
*G06F 16/906* (2019.01)
*G06N 20/00* (2019.01)

(52) U.S. Cl.
CPC ........ *G06F 16/9017* (2019.01); *G06F 16/906* (2019.01); *G06F 16/9014* (2019.01); *G06N 20/00* (2019.01)

(58) Field of Classification Search
CPC ........ G06N 20/00; G06N 3/08; G06F 16/137; G06F 16/3347; G06F 16/906; G06F 16/9014; G06F 16/9017; G06F 40/30; G06F 16/325; G06F 16/3323
See application file for complete search history.

(56) References Cited

U.S. PATENT DOCUMENTS

| | | | | |
|---|---|---|---|---|
| 7,743,003 | B1* | 6/2010 | Tong | G06N 20/00 706/12 |
| 8,229,932 | B2* | 7/2012 | Krishnamurthy | G06F 16/30 707/804 |
| 9,330,104 | B2* | 5/2016 | Wang | G06F 16/137 |
| 2015/0248608 | A1* | 9/2015 | Higgins | G06N 3/088 706/16 |
| 2018/0174579 | A1* | 6/2018 | Henry | G06F 40/253 |
| 2019/0034882 | A1* | 1/2019 | Saha | G06N 20/00 |
| 2019/0095805 | A1* | 3/2019 | Tristan | G06F 16/9027 |

(Continued)

OTHER PUBLICATIONS

Martin Davtyan, "Making Text Search Learn from Feedback", publisher: Filament-AI, published: May 29, 2018, pp. 1-16 (Year: 2018).*

(Continued)

*Primary Examiner* — Wilson W Tsui
(74) *Attorney, Agent, or Firm* — NICHOLSON DE VOS WEBSTER & ELLIOTT LLP (57) ABSTRACT

The disclosed embodiments provide a system for processing data. During operation, the system applies a first set of hash functions to a first entity identifier (ID) for a first entity to generate a first set of hash values. Next, the system produces a first set of intermediate vectors from the first set of hash values and a first set of lookup tables by matching each hash value in the first set of hash values to an entry in a corresponding lookup table in the first set of lookup tables. The system then performs an element-wise aggregation of the first set of intermediate vectors to produce a first embedding. Finally, the system outputs the first embedding for use by a machine learning model.

20 Claims, 5 Drawing Sheets

(56) References Cited

U.S. PATENT DOCUMENTS

2019/0332722 A1\* 10/2019 Ogren .................. G06F 16/9014
2020/0066262 A1\* 2/2020 Shu ........................ G10L 15/197
2020/0089765 A1\* 3/2020 Jayaraman .......... H04L 41/5032

OTHER PUBLICATIONS

Steffen Rendle, "Factorization Machines", Retrieved from: https://www.csie.ntu.edu.tw/~b97053/paper/Rendle2010FM.pdf, Feb. 6, 2019.
Dan Svenstrup, et al., "Hash Embeddings for Efficient Word Representations", Retrieved from: https://arxiv.org/pdf/1709.03933.pdf, Feb. 6, 2019.

\* cited by examiner

COMPACT ENTITY IDENTIFIER EMBEDDINGS

BACKGROUND

Field

The disclosed embodiments relate to embedding models. More specifically, the disclosed embodiments relate to techniques for generating compact entity identifier (ID) embeddings.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

To glean such insights, large data sets of features may be analyzed using regression models, artificial neural networks, support vector machines, decision trees, naïve Bayes classifiers, and/or other types of machine learning models. The discovered information may then be used to guide decisions and/or perform actions related to the data. For example, the output of a machine learning model may be used to guide marketing decisions, assess risk, detect fraud, predict behavior, and/or customize or optimize use of an application or website.

Consequently, machine learning and/or analytics may be facilitated by mechanisms for improving the creation, profiling, management, sharing, and reuse of features and/or machine learning models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for generating and using compact entity identifier (ID) embeddings. Each entity may be a user, company, job, post, advertisement, group, item, product, service, location, search result, and/or another type of entity represented within an online system. As a result, IDs for entities in the online system may span a dimensional space of millions to billions, which may be too sparse and and/or large for efficient use with one-hot encoding and/or one-to-one mapping of the IDs to embeddings.

To improve use of entity IDs with machine learning models, the disclosed embodiments use a set of hash functions to convert each entity ID into a set of hash values. Each hash value is used as an index into a lookup table for the corresponding hash function, and the entry represented by the index in the lookup table is obtained as an intermediate vector representation of the entity ID. Multiple intermediate vectors retrieved using the hash values are then aggregated into an embedding for the entity ID. For example, the embedding may be calculated as an element-wise maximum from the set of intermediate vectors.

Embeddings generated in this way may then be used with machine learning models to represent relationships, preferences, affinities, and/or interactions between or among entities. For example, a member ID and a job ID may be inputted into a machine learning model, and a separate set of hash functions and lookup tables may be used to generate an embedding for each ID. Embeddings for the member and job IDs may then be inputted into additional layers of the machine learning model, and the machine learning model may be trained to predict an outcome associated with the member and job IDs (e.g., a response by the member to a recommendation of the job) based on the IDs and/or corresponding embeddings. In turn, parameters of the machine learning model may be updated so that a measure of distance between the member ID and job ID embeddings reflects the outcome.

By compressing a large set of entity IDs into multiple embedding lookups in spaces of lower dimensionality, the disclosed embodiments may generate embeddings of the entity IDs in a more efficient manner than conventional one-hot encoding of IDs and/or one-to-one mapping of IDs to embeddings. The embeddings may additionally be updated to reflect preferences, affinities, relationships, and/or interactions between or among entities, which may allow machine learning models to make inferences and/or predictions using the embeddings. Consequently, the disclosed embodiments may improve computer systems, applications, user experiences, tools, and/or technologies related to encoding or embedding of IDs, recommendation systems, feature engineering, and/or machine learning.

Compact Entity Identifier Embeddings

Figure 1:
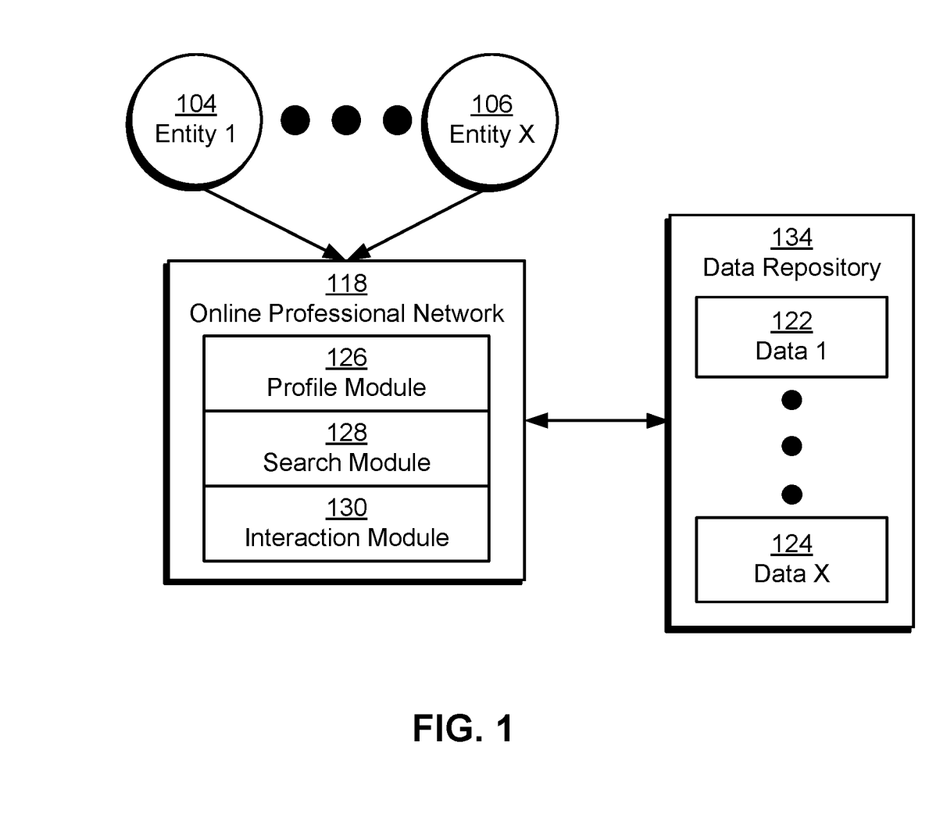
FIG. 1 shows a schematic of a system in accordance with the disclosed embodiments.

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

For example, data in data repository 134 and one or more machine learning models are used to produce rankings of candidates for jobs or opportunities listed within or outside online network 118. The candidates may include users who have viewed, searched for, or applied to jobs, positions, roles, and/or opportunities, within or outside online network 118. The candidates may also, or instead, include users and/or members of online network 118 with skills, work experience, and/or other attributes or qualifications that match the corresponding jobs, positions, roles, and/or opportunities.

After the candidates are identified, profile and/or activity data of the candidates may be inputted into the machine learning model(s), along with features and/or characteristics of the corresponding opportunities (e.g., required or desired skills, education, experience, industry, title, etc.). The machine learning model(s) may output scores representing the strength of the candidates with respect to the opportunities and/or qualifications related to the opportunities (e.g., skills, current position, previous positions, overall qualifications, etc.). The machine learning model(s) may also, or instead, generate scores representing the candidates' level of interest in the opportunities. For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, etc.).

In turn, rankings based on the scores and/or associated insights may improve the quality of the candidates and/or recommendations of opportunities to the candidates, increase user activity with online network 118, and/or guide the decisions of the candidates and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative interest and/or strength with respect to a set of jobs during ordering of the jobs as search results and/or job recommendations that are subsequently displayed to the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

On the other hand, entities in online network 118 may be represented by identifiers (IDs) that span a large number of values and/or dimensions, which may interfere with use of the IDs as input into machine learning models. For example, online network 118 may include millions to billions of members, companies, content items, jobs, advertisements, and/or other types of entities, each identified by a unique numeric ID. To use each entity's ID with a machine learning model, the ID may be converted into a one-hot vector and/or an embedding. However, such one-to-one mappings of entity IDs to vector representations of the entity IDs may require significant computational and/or storage resources (e.g., a vector of n integers to one-hot encode n distinct entity IDs and/or a separate set of weights to calculate an embedding from each entity ID), which may be difficult to scale with large numbers of entity IDs.

Figure 2:
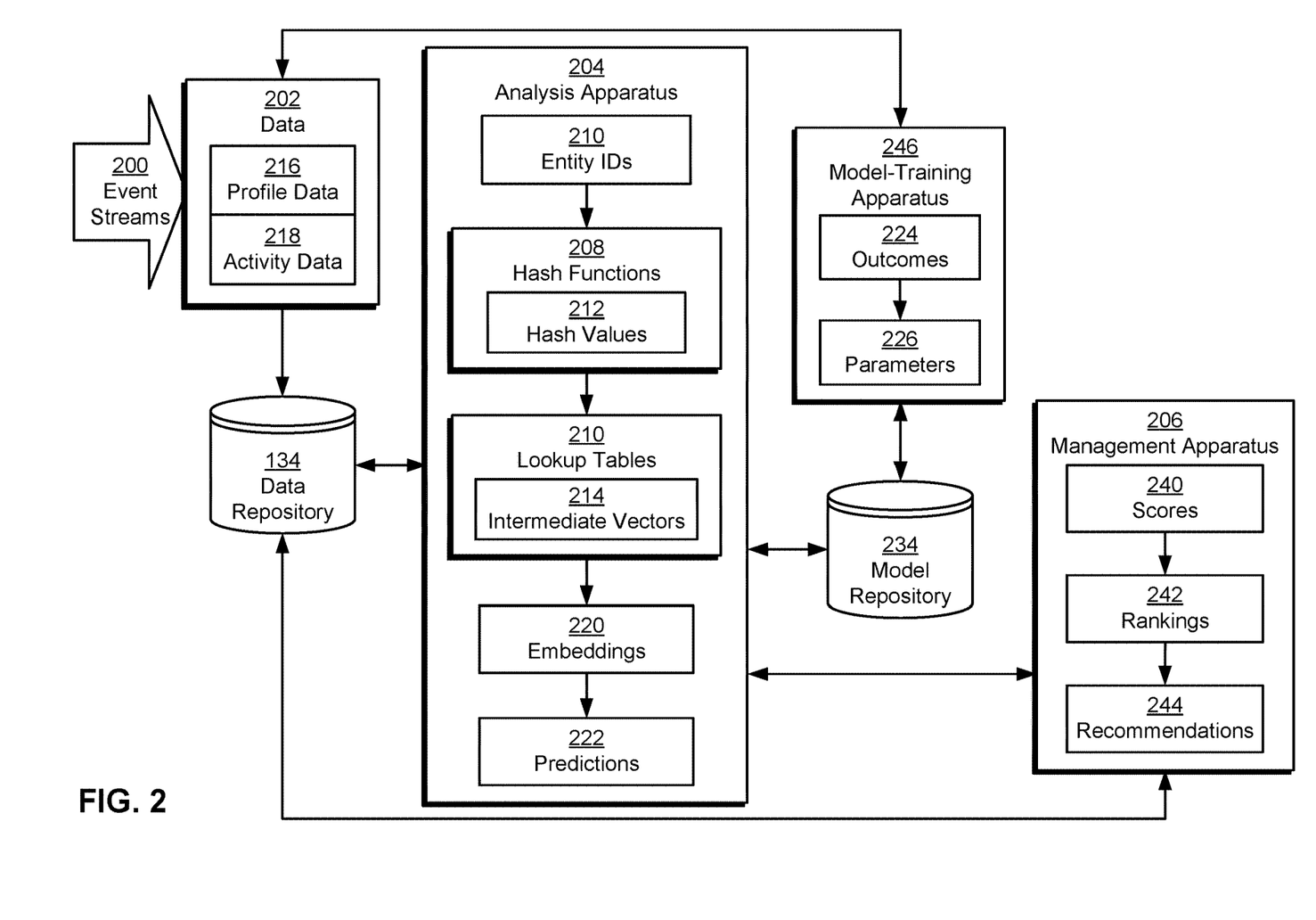
FIG. 2 shows a system for processing data in accordance with the disclosed embodiments.

In one or more embodiments, online network 118 includes functionality to improve the use of entity IDs with machine learning models by generating compact embeddings of the entity IDs using multiple embedding lookups in spaces of lower dimensionality. As shown in FIG. 2, data repository 134 and/or another primary data store may be queried for data 202 that includes profile data 216 for members of an online system (e.g., online network 118 of FIG. 1), as well as activity data 218 that tracks activity by or related to the members within and/or outside the online system.

Profile data 216 includes data associated with member profiles in the community. For example, profile data 216 for an online professional network may include a set of attributes for each user, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Profile data 216 may also include a set of groups to which the user belongs, the user's contacts and/or connections, awards or honors earned by the user, licenses or certifications attained by the user, patents or publications associated with the user, and/or other data related to the user's interaction with the community.

Attributes of the members may be matched to a number of member segments, with each member segment containing a group of members that share one or more common attributes. For example, member segments in the community may be defined to include members with the same industry, title, location, and/or language.

Connection information in profile data 216 may additionally be combined into a graph, with nodes in the graph representing entities (e.g., users, schools, companies, locations, etc.) in the community. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Activity data 218 includes records of user interactions with one another and/or content associated with the community. For example, activity data 218 may be used to track impressions, clicks, likes, dislikes, shares, hides, comments, posts, updates, conversions, and/or other user interaction with content in the community. Activity data 218 may also, or instead, track other types of community activity, including connections, messages, job applications, job searches, recruiter searches for candidates, interaction between candidates 116 and recruiters, and/or interaction with groups or events. Activity data 218 may further include social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. Activity data 218 may additionally include schedules, calendars, and/or upcoming availabilities of the users, which may be used to schedule meetings, interviews, and/or events for the users. Like profile data 216, activity data 218 may be used to create a graph, with nodes in the graph representing community members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

Activity data 218 may also, or instead, include records of actions and/or events that are generated by and/or involve non-human entities. For example, activity data 218 may include database transactions, service calls, processing workflows, garbage collection, load balancing, and/or other events related to execution of hardware and/or software components in the online system. In another example, activity data 218 may include records of recommendations, search results, notifications, emails, reminders, offers, and/or other output that is generated by the online system and delivered to users.

Profile data 216, activity data 218, and/or other data 202 in data repository 134 may be standardized before the data is used by components of the system. For example, skills in profile data 216 may be organized into a hierarchical taxonomy that is stored in data repository 134 and/or another repository. The taxonomy may model relationships between skills (e.g., "Java programming" is related to or a subset of "software engineering") and/or standardize identical or highly related skills (e.g., "Java programming," "Java development," "Android development," and "Java programming language" are standardized to "Java").

Profile data 216, activity data 218, and/or other data 202 in data repository 134 may additionally include and/or be associated with entity IDs 210 of entities in the online system. For example, each record of profile data 216 in the online system may be associated with a unique ID for a corresponding member, company, and/or another type of entity with a profile or account in the online system. The record may also include IDs of one or more standardized skills, industries, titles, and/or locations listed in the profile data. In another example, each record of activity data 218 may include an ID for a first entity performing the activity, a second ID for a second entity to which the activity is applied, and/or one or more additional IDs of other entities involved in or affected by the activity (e.g., a third entity recommended by the first entity to the second entity, one or more connections shared by two entities, one or more entities witnessing an interaction between two entities, etc.). As the number of entity IDs 210 increases, profile data 216 and/or activity data 218 may become increasingly sparse in the high-dimensional space represented by entity IDs 210 and/or combinations of entity IDs 210.

In one or more embodiments, the system of FIG. 2 includes functionality to efficiently convert a high-dimensional space of entity IDs 210 into lower-dimensional embeddings 220 that can be used by machine learning models to make predictions 222 based on interactions, relationships, preferences, associations, and/or affinities between or among the corresponding entities. More specifically, an analysis apparatus 204 inputs entity IDs 210 into one or more sets of hash functions 208 to produce hash values 212 from entity IDs 210. For example, analysis apparatus 204 may apply a different set of hash functions 208 to each type of entity ID (e.g., member ID, company ID, job ID, content ID, product ID, item ID, etc.) in the online system to produce a corresponding set of hash values 212 with a smaller range of values than the set of possible entity IDs 210.

Next, analysis apparatus 204 uses hash values 212 as indexes into lookup tables 210 associated with hash functions 208 to obtain a set of intermediate vectors 214 representing each entity ID. For example, each hash function may be mapped to a separate hash table, and each entry in the hash table may include a vector of a fixed size. As a result, the hash value outputted by the hash function for a given entity ID may be used to retrieve the corresponding entry from the hash table as one of the entity ID's intermediate vectors 214.

Analysis apparatus 204 then aggregates intermediate vectors 214 into embeddings 220 for the corresponding entity IDs 210. For example, analysis apparatus 204 may generate an embedding for an entity ID as the element-wise minimum, maximum, sum, average, variance, and/or standard deviation of all intermediate vectors 214 produced from the entity ID.

As a result, analysis apparatus 204 may generate embeddings 220 more efficiently than techniques that perform one-to-one mapping of entity IDs to embeddings. For example, a one-to-one mapping of 500 million entity IDs 210 to 100-dimensional embeddings using weights that are four bytes each may require 500,000,000*100*4 bytes, or around 200 GB. On the other hand, analysis apparatus 204 may use three hash functions 208 to generate three sets of 5,000,000 possible hash values 212 from one entity ID, and each hash value may then be used to retrieve a 100-dimensional intermediate vector from a corresponding hash table. In turn, embeddings 220 generated by analysis apparatus 204 from the same number or a different number of entity IDs 210 may require 5,000,000*3*100*4 bytes, or around 6 GB.

At the same time, the use of multiple hash functions 208, lookup tables 210, and/or element-wise aggregations to generate embeddings 220 from entity IDs 210 may reduce the likelihood that the same embedding is produced from multiple entity IDs 210. Continuing with the above example, the mapping of 500 million entity IDs 210 into 5 million hash values 212 may result in the same hash value for an average of 100 entity IDs 210. However, if three different hash functions 208 are used, 500 million entity IDs 210 may map to $1.25*10^{20}$ unique sets of hash values 212. Moreover, the element-wise aggregation of three intermediate vectors 214 into embeddings 220 may increase the likelihood that a given entity ID is uniquely represented at each dimension of the resulting embedding.

Analysis apparatus 204 additionally inputs embeddings 220 into machine learning models and uses the machine learning models to generate predictions 222 based on embeddings 220 and/or other input. For example, analysis apparatus 204 may input embeddings 220 and/or additional features (e.g., features obtained or derived from profile data 216 and/or activity data 218) for two or more member IDs, job IDs, company IDs, and/or other types of entity IDs 210 into an artificial neural network. In turn, the artificial neural network may output one or more scores 240 representing predictions 222 of preferences, affinities, relationships, and/or likelihoods of interactions between or among the corresponding entities. Using machine learning models to generate predictions based on embeddings of entity IDs is described in further detail below with respect to FIG. 3.

A model-training apparatus 246 trains the machine learning models to generate predictions 222 based on the input and outcomes 224 associated with the input. First, model-training apparatus 246 obtains outcomes 224 as positive or negative labels associated with pairs of entities. A positive label may represent a positive outcome between a pair of entities (e.g., sending a connection request, accepting a connection request, applying to a job, clicking on a recommendation, etc.), while a negative label may represent a negative outcome between a pair of entities (e.g., ignoring or rejecting a connection request, dismissing a recommendation, etc.).

Next, model-training apparatus 246 uses a training technique and/or one or more hyperparameters to update parameters 226 of a machine learning model so that the machine learning model learns to predict outcomes 224 based on the inputted embeddings 220 and/or features. For example, the machine learning model may include a deep learning model with a number of layers between entity IDs 210 and/or features inputted into the deep learning model and predictions 222 outputted by the deep learning model. Different subsets of layers in the deep learning model may be used to calculate hash values 212 from entity IDs 210, generate intermediate vectors 214 from hash values 212, and/or generate predictions 222 from embeddings 220. As a result, model-training apparatus 246 may perform backpropagation and gradient descent on parameters 226 in the layers to reduce the error between predictions 222 and the corresponding outcomes 224.

In turn, the machine learning model may learn to generate embeddings 220 from entity IDs 210 in a way that reflects relationships, preferences, interactions, and/or affinities among the corresponding entities. Continuing with the above example, the deep learning model may generate one embedding from a member ID and another embedding from a job ID and output a prediction representing a member's likelihood of having a positive interaction with a job. As a result, the deep learning model may learn to generate embeddings 220 of member and job IDs that are closer to one another in a vector space when the corresponding member-job pairs are associated with positive outcomes 224 (e.g., a member applying to and/or saving a job). Conversely, the deep learning model may learn to generate embeddings 220 of member and job IDs that are farther apart in the vector space when the corresponding member-job pairs are associated with negative outcomes 224 (e.g., a member ignoring and/or dismissing a job).

After a machine learning model is created and/or updated, model-training apparatus 246 stores parameters 226 of the machine learning model in a model repository 234. For example, model-training apparatus 246 may replace old values of parameters 226 in model repository 234 with the updated parameters 226, or model-training apparatus 246 may store the updated parameters 226 separately from the old values (e.g., by storing each set of parameters 226 with a different version number of the corresponding model). Model-training apparatus 246 may also, or instead, provide the latest parameters 226 to analysis apparatus 204 and/or another component of the system for subsequent use in generating embeddings 220 and/or predictions 222 from a corresponding set of entity IDs 210.

In turn, analysis apparatus 204 and/or other components of the system may use parameters 226 and/or output of the machine learning model to perform additional processing and/or inference related to entity IDs 210. For example, analysis apparatus 204 may obtain embeddings 220 of entity IDs 210 from the machine learning model and apply a collaborative filtering and/or matrix factorization technique to embeddings 220 to generate additional predictions 222 and/or inferences related to the corresponding entities.

A management apparatus 206 uses output from analysis apparatus 204 and/or model-training apparatus 246 to generate recommendations 244 related to entity IDs 210, embeddings 220, and/or predictions 222. For example, management apparatus 206 may generate recommendations 244 within a job search and/or recruiting tool as search results of job searches by candidates, search results of recruiters' candidate searches for specific jobs, and/or job recommendations that are displayed and/or transmitted to the candidates.

To generate job-related recommendations 244, management apparatus 206 may retrieve and/or request scores 240 from analysis apparatus 204 that represent a candidate's compatibility with a job, the likelihood that the candidate has a positive response to the job, and/or the candidate's strength or quality with respect to requirements or qualifications of the job. Analysis apparatus 204 may input entity IDs 210 of multiple sets of entities (e.g., recruiters and candidates, candidates and jobs, recruiters and candidates and jobs, etc.) into a machine learning model, and the machine learning model may generate embeddings 220 of the inputted entity IDs 210 and corresponding scores 240 between or among the entities. Management apparatus 206 may then generate rankings 242 of jobs and/or candidates by the corresponding scores 240 and output recommendations 244 based on rankings 242 (e.g., recommendations 244 of jobs that are most likely to be interesting to a candidate, candidates that are most likely to be interesting to a recruiter, etc.).

By compressing a large set of entity IDs 210 into multiple embedding lookups in spaces of lower dimensionality, the system of FIG. 2 may generate embeddings 220 of entity IDs 210 in a more efficient manner than conventional one-hot encoding of IDs and/or one-to-one mapping of IDs to embeddings. Embeddings 220 may additionally be updated to reflect preferences, affinities, relationships, and/or interactions between or among entities, which may allow machine learning models to make inferences and/or predictions using the embeddings. Consequently, the disclosed embodiments may improve computer systems, applications, user experiences, tools, and/or technologies related to encoding or embedding of IDs, recommendation systems, feature engineering, and/or machine learning.

Those skilled in the art will appreciate that the system of FIG. 2 may be implemented in a variety of ways. First, analysis apparatus 204, model-training apparatus 246, management apparatus 206, data repository 134, and/or model repository 234 may be provided by a single physical machine, multiple computer systems, one or more virtual machines, a grid, one or more databases, one or more filesystems, and/or a cloud computing system. Analysis apparatus 204, model-training apparatus 246, and management apparatus 206 may additionally be implemented together and/or separately by one or more hardware and/or software components and/or layers. Analysis apparatus 204, model-training apparatus 246, and/or management apparatus 206 may further execute in an offline, online, and/or on-demand basis to accommodate requirements or limitations associated with the processing, performance, or scalability of the system; the availability of outcomes 224 and/or features associated with outcomes 224; and/or activity by entities represented by entity IDs 210.

Second, a number of models and/or techniques may be used to generate hash functions 208, lookup tables 210, embeddings 220, predictions 222, scores 240, and/or rankings. For example, the functionality of analysis apparatus 204 may be implemented using one or more artificial neural networks, regression models, deep learning models, support vector machines, decision trees, random forests, hierarchical models, ensemble models, and/or other types of machine learning models.

Third, the system may be adapted to different types of entities and/or predictions 222. For example, the system may be used to generate embeddings 220 and/or predictions 222 related to interactions, preferences, similarity, and/or compatibility between or among users, content, advertisements, products, services, service providers, schools, businesses, and/or governments.

Figure 3:
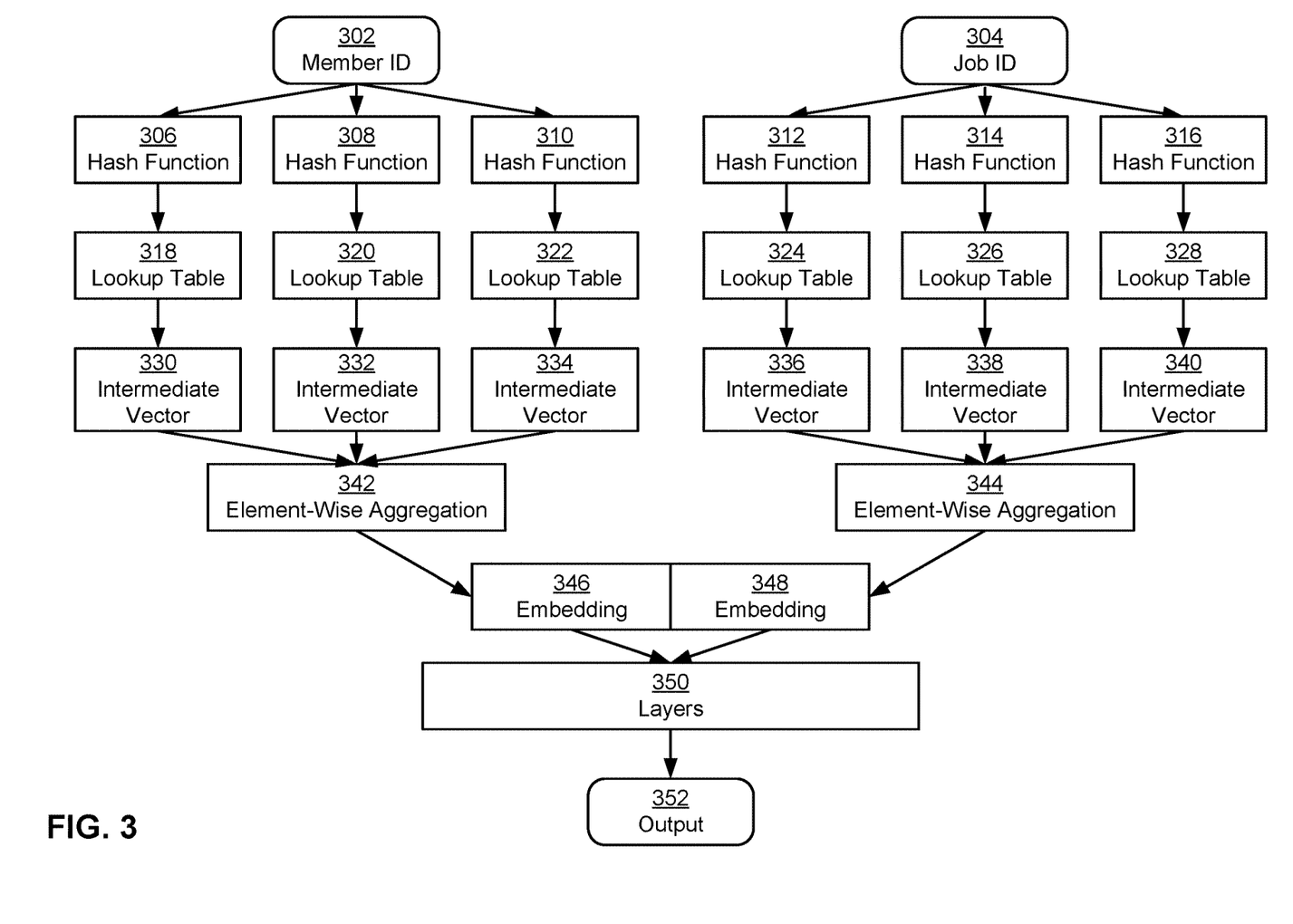
FIG. 3 shows an example machine learning model in accordance with the disclosed embodiments.

FIG. 3 shows an example machine learning model in accordance with the disclosed embodiments. More specifically, FIG. 3 shows a machine learning model that generates embeddings 346-348 from entity IDs. As shown in FIG. 3, the entity IDs include a member ID 302 and a job ID 304. Within the machine learning model, member ID 302 is inputted into three hash functions 306-310, and job ID 304 is inputted into three other hash functions 312-316.

Hash functions 306-310 produce three hash values from member ID 302, and hash functions 312-316 produce three other hash values from job ID 304. Hash values outputted by hash functions 306-310 are used as indexes into three lookup tables 318-322, and hash values outputted by hash functions 312-316 are used as indexes into three other lookup tables 324-328. In other words, each hash function may map to a separate lookup table.

All six lookup tables 318-328 may store the same number of entries (e.g., a number of entries spanned by the range of values outputted by the corresponding hash functions 306-316), and all entries in lookup tables 318-328 may contain real-valued vectors with the same dimensionality. In turn, integer hash values generated by hash functions 306-316 may be used to retrieve intermediate vectors 330-340 of the same size from the corresponding lookup tables 318-328.

An element-wise aggregation 342 is applied to intermediate vectors 330-334 to produce embedding 346, and another element-wise aggregation 344 is applied to intermediate vectors 336-340 to produce embedding 348. For example, element-wise aggregations 342-344 may compute embeddings 346-348 as the element-wise maximums from the corresponding intermediate vectors 330-340. In turn, embedding 346 may represent member ID 302, and embedding 348 may represent job ID 304.

Embeddings 346-348 are concatenated and inputted into one or more additional layers 350 of the machine learning model to generate output 352 of the machine learning model. For example, the machine learning model may include a dense layer that is fully connected to each vector element in the concatenated embeddings 346-348. The machine learning model may also include a softmax layer after the dense layer, which generates output 352 as two or more values representing predicted likelihoods associated with member ID 302 and job ID 304 (e.g., one value representing the likelihood that the member represented by member ID 302 applies to the job represented by job ID 304 and another value representing the likelihood that the member does not apply to the job).

The machine learning model may be trained to generate output 352 that reflects outcomes associated with pairs of member IDs and job IDs. For example, errors between likelihoods outputted by the machine learning model and positive or negative outcomes between members and jobs may be backpropagated across layers and/or components of the machine learning model. As a result, parameters related to layers 350, embeddings 346-348, intermediate vectors 330-340, lookup tables 318-328, and/or hash functions 306-

316 may be updated so that the machine learning model learns to predict the outcomes, given the corresponding member IDs and job IDs. In turn, measures of "distance" between embeddings 346-348 generated by the machine learning model may reflect outcomes related to the corresponding entities.

The machine learning model may also be modified to generate embeddings and/or output 352 for different types and/or combinations of input. For example, additional hash functions, lookup tables, and/or element-wise aggregations may be added to the machine learning model to generate embeddings and/or output 352 for three or more entities based on relationships, preferences, affinities, similarities, and/or interactions among the entities. In another example, one entity ID and/or embedding may be replaced and/or supplemented with a feature vector containing encoded or embedded representations of features for the corresponding entity. In turn, the machine learning model may learn embeddings for the remaining entity ID based on relationships and/or outcomes between the remaining entity ID and the features.

Figure 4:
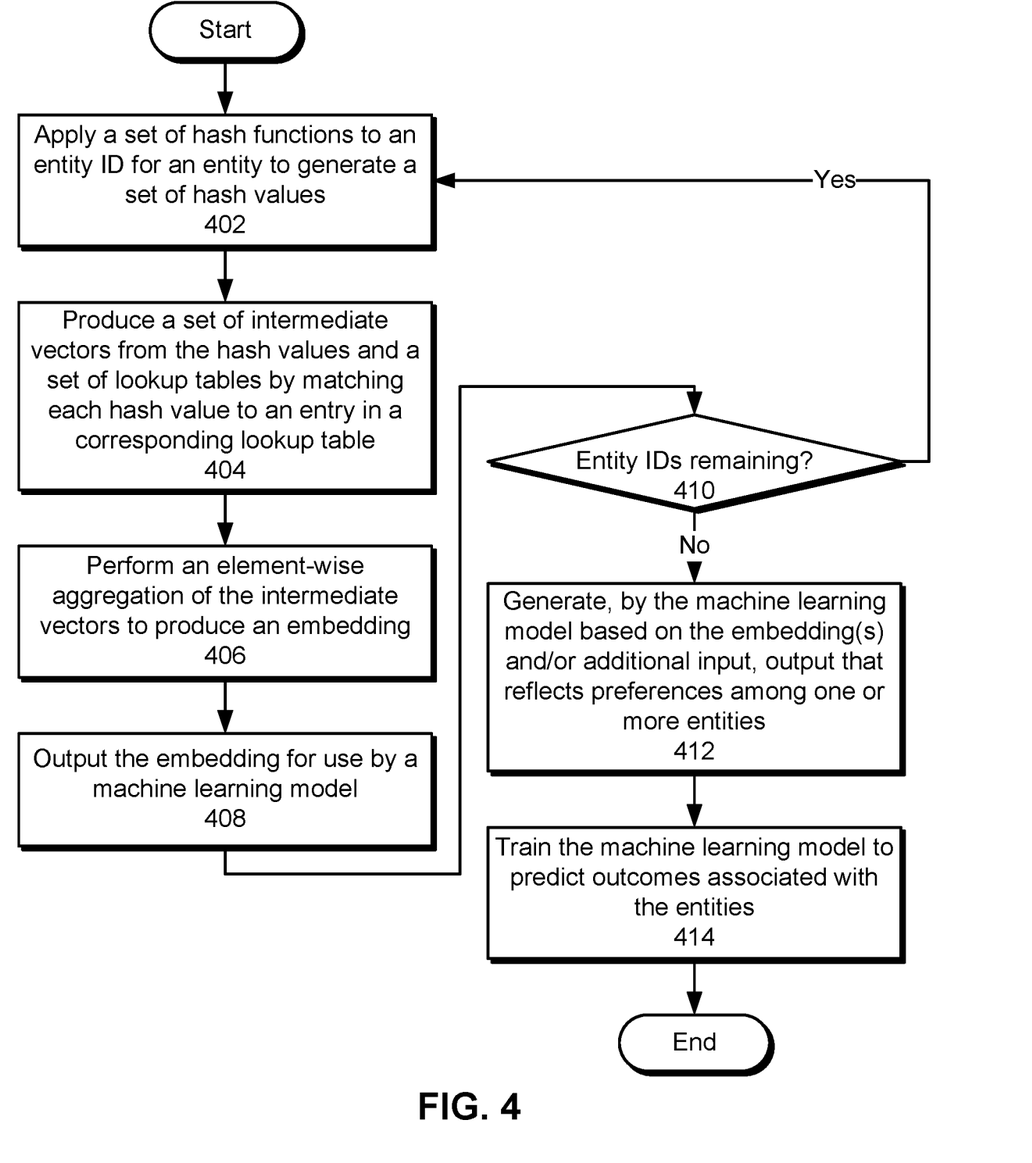
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of hash functions is applied to an entity ID for an entity to generate a set of hash values (operation 402). For example, a pre-specified number of hash functions may be applied to a member ID, job ID, company ID, content ID, and/or other type of high-dimensionality entity ID to generate a set of lower-dimensionality hash values.

Next, a set of intermediate vectors is produced from the hash values and a set of lookup tables by matching each hash value to an entry in a corresponding lookup table (operation 404). For example, each hash function may be mapped to a separate lookup table, and the hash value produced by the hash function may be used as an index into the lookup table. The entry stored at the index may then be retrieved as an intermediate vector associated with the hash function and/or lookup table.

An element-wise aggregation of the intermediate vectors is then used to produce an embedding (operation 406) that is outputted for use by a machine learning model (operation 408). For example, a sum, average, maximum, minimum, and/or other type of aggregation may be applied to corresponding elements of the intermediate vectors to produce an embedding with the same dimensionality as the intermediate vectors. The embedding may then be stored as a vector representation of the entity ID and/or inputted into the machine learning model.

Operation 402-408 may be repeated for remaining entity IDs (operation 410). For example, embeddings of member IDs may be produced from one set of hash functions and lookup tables, embeddings of job IDs may be produced from another set of hash functions and lookup tables, and embeddings of company IDs may be produced from a third set of hash functions and lookup tables.

Output that reflects preferences among one or more entities is then generated by the machine learning model based on the outputted embedding(s) and/or additional input (operation 412). For example, the machine learning model may output one or more values representing likelihoods of interaction between and/or among members, jobs, and/or companies based on embeddings representing the members, jobs, and/or companies and/or additional features associated with the members, jobs, and/or companies.

The machine learning model is additionally trained to predict outcomes associated with the entities (operation 414). For example, parameters in the machine learning model for generating the embeddings from the entity IDs may be updated so that "distances" between the entity IDs reflect the outcomes. In another example, additional parameters in the machine learning model for calculating the output from the embedding and/or the additional input may be updated based on the outcome.

Figure 5:
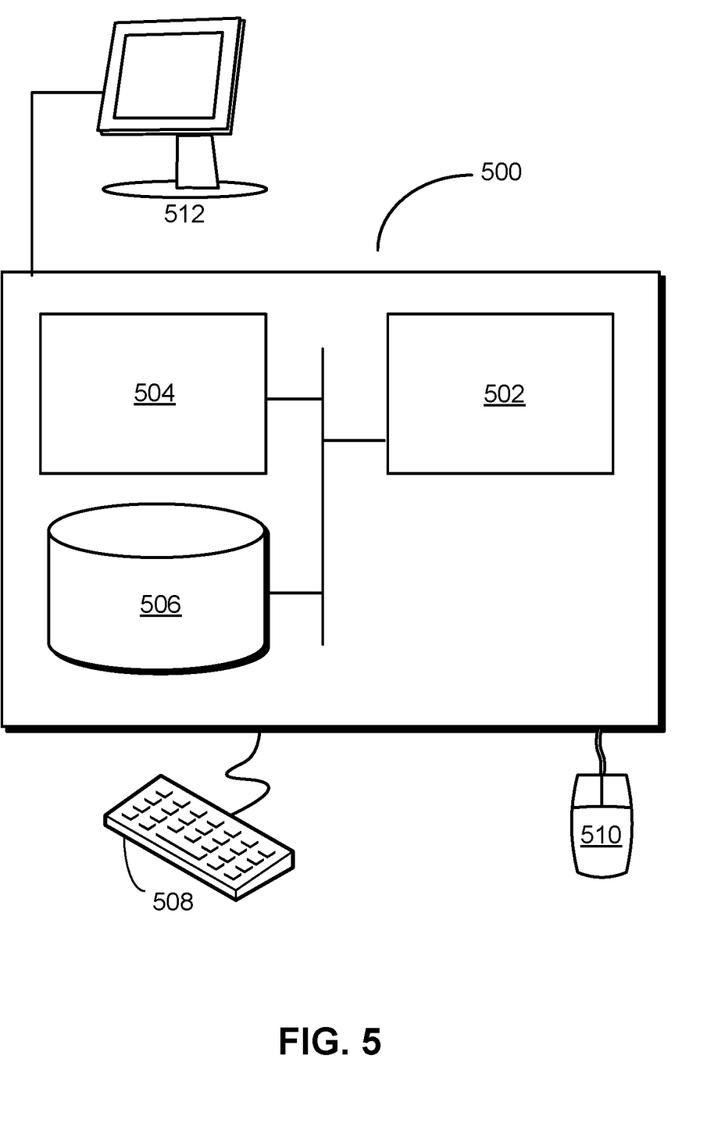
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system applies hash functions to entity IDs for one or more entities to generate a set of hash values. Next, the system produces intermediate vectors from the hash values and a set of lookup tables by matching each hash value to an entry in a corresponding lookup table in the set of lookup tables. The system then performs an element-wise aggregation of the first set of intermediate vectors to produce a first embedding. Finally, the system outputs the first embedding for use by a machine learning model.

In addition, one or more components of computer system 500 may be remotely located and connected to the other components over a network. Portions of the present embodiments (e.g., analysis apparatus, model-training apparatus, management apparatus, data repository, model repository, online network, etc.) may also be located on different nodes of a distributed system that implements the embodiments. For example, the present embodiments may be implemented using a cloud computing system that generates compact entity ID embeddings for a set of remote entities.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
  applying, by one or more computer systems, a first set of hash functions to a first entity identifier (ID) for a first entity to generate a first set of hash values;
  using the first set of hash values as indexes, retrieving, from a first set of lookup tables, a first set of intermediate vectors that represent the first entity ID, wherein the first set of intermediate vectors has a dimensionality comprising a common number of dimensions associated with the first entity and a dimension comprises a numeric value;
  aggregating corresponding dimensions of the first set of intermediate vectors using an element-wise aggregation to produce a first embedding that represents the first entity ID and has the same dimensionality as the first set of intermediate vectors;
  applying a machine learning model to an embedding pair comprising the first embedding and a second embedding that represents a second entity ID, wherein the second embedding is produced by element-wise aggregation of a second set of intermediate vectors retrieved from a second set of lookup tables using a second set of hash values as indexes and has the same dimensionality as the first embedding;
  based on the embedding pair, generating, by the machine learning model, output that represents a likelihood value, wherein the likelihood value is associated with a positive label as an indication of a positive interaction between the first entity and a second entity associated with the second entity ID; and
  training the machine learning model to predict an outcome associated with the first entity and the second entity based on the first embedding and an additional input.

2. The method of claim 1, further comprising:
  updating, based on the output, parameters in the machine learning model for generating the first embedding from the first entity ID.

3. The method of claim 2, further comprising:
  updating, based on the output, additional parameters in the machine learning model for generating the second embedding from the second entity ID for the second entity.

4. The method of claim 1, further comprising:
  updating, based on the output, parameters for calculating subsequent output from embedding pairs.

5. The method of claim 1, further comprising:
  applying a second set of hash functions to the second entity ID for the second entity to produce the second set of hash values;
  producing the second set of intermediate vectors from the second set of hash values and the second set of lookup tables associated with the second set of hash values; and
  combining the second set of intermediate vectors into the second embedding.

6. The method of claim 1, wherein the second embedding comprises features associated with the second entity.

7. The method of claim 1, wherein the first entity comprises at least one of:
  a member;
  a job;
  a company; or
  a content item.

8. The method of claim 1, wherein the element-wise aggregation comprises an element-wise maximum of a set of intermediate vectors.

9. The method of claim 1, wherein:
  the machine learning model is trained on labeled entity pairs;
  a labeled entity pair comprises a pair of entity identifiers and either a positive label or a negative label;
  a positive label represents a positive outcome between the entities associated with the pair of entity identifiers; and
  a negative label represents a negative outcome between the entities associated with the pair of entity identifiers.

10. A system comprising:
  one or more processors; and
  memory storing instructions that, when executed by the one or more processors, cause the system to:
  using a first set of hash values as indexes, retrieve, from a first set of lookup tables, a first set of intermediate vectors that represent a first entity identifier (ID), wherein the first set of intermediate vectors has a dimensionality comprising a common number of dimensions associated with the first entity and a dimension comprises a numeric value;
  aggregate corresponding dimensions of the first set of intermediate vectors using an element-wise aggregation to produce a first embedding that represents the first entity ID and has the same dimensionality as the first set of intermediate vectors;
  apply a machine learning model to an embedding pair comprising the first embedding and a second embedding that represents a second entity ID, wherein the second embedding is produced by element-wise aggregation of a second set of intermediate vectors retrieved from a second set of lookup tables using a second set of hash values as indexes and has the same dimensionality as the first embedding;
  based on the embedding pair, generate, by the machine learning model, output that represents a likelihood value, wherein the likelihood value is associated with a positive label as an indication of a positive interaction between the first entity and a second entity associated with the second entity ID; and
  train the machine learning model to predict an outcome associated with the first entity and the second entity based on the first embedding and an additional input.

11. The system of claim 10, wherein the instructions, when executed by the one or more processors, cause the system to:
update, based on the outcome output, parameters in the machine learning model for generating the first embedding from the first entity ID and generating the second embedding.

12. The system of claim 10, wherein the instructions, when executed by the one or more processors, cause the system to:
update, based on the output, parameters for calculating subsequent output from embedding pairs.

13. The system of claim 10, wherein the instructions, when executed by the one or more processors, cause the system to:
apply a second set of hash functions to the second entity ID for the second entity to produce the second set of hash values;
produce the second set of intermediate vectors from the second set of hash values and the second set of lookup tables associated with the second set of hash values; and
combine the second set of intermediate vectors into the second embedding.

14. The system of claim 10, wherein the second embedding comprises features associated with the second entity.

15. The system of claim 10, wherein the element-wise aggregation comprises an element-wise maximum of a set of intermediate vectors.

16. The system of claim 10, wherein:
the machine learning model is trained on labeled entity pairs;
a labeled entity pair comprises a pair of entity identifiers and either a positive label or a negative label;
a positive label represents a positive outcome between the entities associated with the pair of entity identifiers; and
a negative label represents a negative outcome between the entities associated with the pair of entity identifiers.

17. A non-transitory computer-readable storage medium storing instructions that when executed by a computer cause the computer to perform operations comprising:
applying, by one or more computer systems, a first set of hash functions to a first entity identifier (ID) for a first entity to generate a first set of hash values;
using the first set of hash values as indexes, retrieving, from a first set of lookup tables, a first set of intermediate vectors that represent the first entity ID, wherein the first set of intermediate vectors has a dimensionality comprising a common number of dimensions associated with the first entity and a dimension comprises a numeric value;
aggregating corresponding dimensions of the first set of intermediate vectors using an element-wise aggregation to produce a first embedding that represents the first entity ID and has the same dimensionality as the first set of intermediate vectors;
applying a machine learning model to an embedding pair comprising the first embedding and a second embedding that represents a second entity ID, wherein the second embedding is produced by element-wise aggregation of a second set of intermediate vectors retrieved from a second set of lookup tables using a second set of hash values as indexes and has the same dimensionality as the first embedding;
based on the embedding pair, generating, by the machine learning model, output that represents a likelihood value, wherein the likelihood value is associated with a positive label as an indication of a positive interaction between the first entity and a second entity associated with the second entity ID; and
training the machine learning model to predict an outcome associated with the first entity and the second entity based on the first embedding and an additional input.

18. The non-transitory computer-readable storage medium of claim 17, wherein:
the machine learning model is trained on labeled entity pairs to generate output that represents a likelihood of the first entity having a positive interaction with a second entity associated with a second entity ID;
a labeled entity pair comprises a pair of entity identifiers and either a positive label or a negative label;
a positive label represents a positive outcome between the entities associated with the pair of entity identifiers; and
a negative label represents a negative outcome between the entities associated with the pair of entity identifiers.

19. The non-transitory computer-readable storage medium of claim 17, wherein the instructions, when executed by a computer cause the computer to perform operations further comprising at least one of:
updating, based on the output, parameters in the machine learning model for generating the first embedding from the first entity ID; or
updating, based on the output, additional parameters in the machine learning model for generating the second embedding from the second entity ID for the second entity; or
updating, based on the output, parameters for calculating subsequent output from embedding pairs; or
(i) applying a second set of hash functions to the second entity ID for the second entity to produce the second set of hash values, (ii) producing the second set of intermediate vectors from the second set of hash values and the second set of lookup tables associated with the second set of hash values, and (iii) combining the second set of intermediate vectors into the second embedding.

20. The non-transitory computer-readable storage medium of claim 17, wherein at least one of:
the second embedding comprises features associated with the second entity; or
the first entity comprises at least one of a member, a job, a company, or a content item; or
the element-wise aggregation comprises an element-wise maximum of a set of intermediate vectors.

* * * * *